United States Patent [19]

Seymour et al.

[11] 3,893,988

[45] July 8, 1975

[54] COPOLYMERS OF ALKOXY AND HYDROXY ALKYL METHACRYLATES AND A PROCESS FOR THEIR PREPARATION

[75] Inventors: Donald Edwin Seymour, London; Nicholas Mario Da Costa, Harlow, both of England

[73] Assignee: Hydron Limited, London, England

[22] Filed: May 10, 1973

[21] Appl. No.: 359,045

Related U.S. Application Data

[62] Division of Ser. No. 867,379, Oct. 17, 1969, Pat. No. 3,780,003.

[52] U.S. Cl.......... 260/86.1 E; 117/138.8; 117/145; 117/155; 117/161; 260/80.72; 260/80.73; 260/80.75; 260/80.76; 260/80.81
[51] Int. Cl. ............................................. C08f 15/16
[58] Field of Search ......... 260/80.75, 80.76, 86.1 E, 260/80.72, 80.73, 80.81

[56] References Cited
UNITED STATES PATENTS

| | | | |
|---|---|---|---|
| 2,412,476 | 12/1946 | Semegen | 260/86.1 E |
| 2,588,398 | 3/1952 | Mast et al. | 260/86.1 E |
| 2,594,560 | 4/1952 | Howard | 260/86.1 E |
| 3,577,518 | 5/1971 | Shepherd et al. | 424/47 |
| 3,784,540 | 1/1974 | Kliment et al. | 260/86.1 E |

*Primary Examiner*—Harry Wong, Jr.

[57] ABSTRACT

This invention relates to copolymers and provides copolymer obtainable by copolymerising (a) at least one alkoxy alkyl acrylate or methacrylate with (b) at least one hydroxy alkyl acrylate or methacrylate or at least one different alkoxy alkyl acrylate or methacrylate and optionally with a minor amount of a further monomer. The invention also provides a process for making such copolymers.

2 Claims, No Drawings

COPOLYMERS OF ALKOXY AND HYDROXY ALKYL METHACRYLATES AND A PROCESS FOR THEIR PREPARATION

This is a division, of application Ser. No. 867,379, filed Oct. 17, 1969, and now U.S. Pat. No. 3,780,003.

The present invention relates to novel copolymers.

According to the present invention there is provided a copolymer obtainable by copolymerising (a) at least one alkoxy alkyl acrylate or methacrylate with (b) at least one hydroxy alkyl acrylate or methacrylate or at least one different alkoxy alkyl acrylate or methacrylate and optionally with a minor amount of a further monomer.

Where reference is made throughout the specification and claims to alkoxy alkyl acrylates and methacrylates, the alkoxy groups present are unbranched.

Preferably the minor amount of further monomer is no more than 10% by volume based on the total volume of monomers.

Where reference is made to the optional use of a further monomer it is to be appreciated that more than one such further monomer may be used if desired.

Preferred further monomers are acrylic acid, methacrylic acid, acrylamide, mono- and di- acrylates of glycols and poly glycols, (e.g. glycerol and polyalkylene glycols), mono- and di- methacrylates of glycols and polyglycols (e.g. glycerol and polyalkylene glycols), glycidyl acrylates and glycidyl methacrylates.

The further monomer or monomers may be present as an impurity in the major constituents of the reaction mixture or may be specifically added e.g. to provide for cross-linking.

Where the copolymer is one obtainable by reaction of an alkoxy alkyl acrylate or methacrylate with a different alkoxy alkyl acrylate or methacrylate it may be preferred that no monomers are present other than alkoxy alkyl acrylates or methacrylates and polymers thereof. It is to be understood that a minor amount of an alkyl ester of the free acid may be present as an impurity.

The copolymers of the present invention may be used to make both films and coatings which are moisture vapour permeable and gas permeable (preferably air permeable). The properties of the film or coating may be varied by varying the proportions of the ingredients used to make the copolymer.

The preferred hydroxy alkyl acrylates and methacrylates are hydroxy ethyl methacrylates (HEMA), hydroxy propyl acrylate (HPA) and hydroxy propyl methacrylate (HPMA).

Where hydroxy alkyl acrylates and methacrylates are used (e.g. HEMA) it may be desirable to use no more than 90% by volume of the hydroxy monomer.

Preferred alkoxy alkyl acrylates and methacrylates are ethoxy ethyl methacrylate (EEMA) and methoxy ethyl methacrylate (MEMA).

A preferred alkoxy alkyl methacrylate/alkoxy alkyl methacrylate copolymer is one obtainable by copolymerising EEMA and MEMA.

The hydroxy and alkoxy groups are usually not attached to the carbon atom of the alkyl groups connected to the oxygen groups of the ester linkage. For example the HEMA used is usually 2-hydroxy ethyl methacrylate, the MEMA used is usually 2-methoxyethyl methacrylate, the HPA used is usually 2-hydroxy propyl acrylate, the EEMA used is usually 2-ethoxyethylmethacrylate, and the HPMA used is usually 2-hydroxypropylmethacrylate.

Other monomers which have been found to be useful include 2-methoxyethyl acrylate, 2-ethoxyethyl acrylate, 2-butoxyethyl acrylate, methoxymethyl methacrylate, ethoxymethyl methacrylate and 2-butoxyethyl methacrylate.

As mentioned above the properties of the copolymers will vary depending on the proportions of the various ingredients used to make up the copolymer. For example in copolymers involving hydroxy alkyl acrylates or methacrylates a high proportion of alkoxy alkyl acrylate or methacrylate (e.g. EEMA) gives flexible, high moisture vapour permeable, non water-swellable films at 20°C., whereas a high proportion of a hydroxy alkyl methacrylate (e.g. HEMA) gives high moisture vapour permeable, brittle, water-swellable films (properties at 20°C.) For example, a copolymer made up from 80% by volume EEMA and 20% by volume HEMA is flexible and is negligably swollen by water, whereas a copolymer made up from 50% by volume EEMA and 50% by volume HEMA is brittle and is swollen by water.

Copolymers of ethoxy ethyl methacrylate (EEMA) and methoxy ethyl methacrylate (MEMA) and containing a high proportion of MEMA will tend to be stiff and brittle (especially at temperatures in the region of 5°C) whereas similar copolymers containing a large proportion of EEMA will be flexible.

The present invention also provides a process for the production of a copolymer which comprises copolymerising, in an inert atmosphere, (a) an alkoxy alkyl acrylate or methacrylate with (b) an hydroxy alkyl acrylate or methacrylate or a different alkoxy alkyl acrylate or methacrylate and optionally with a minor amount of a further monomer.

A free radical initiator, preferably a catalyst, for example, tertiary butyl peroctoate may be used. The reaction may be performed in a solvent, preferably by refluxing in an inert $CO_2$ or $N_2$ atmosphere for 8 hours. Preferred solvents for polymerisations involving hydroxy alkyl acrylates or methacrylates are for example ethyl acetate, industrial methylated spirits, ethanol, methanol or dimethyl formamide. Preferred solvents for polymerisations not involving hydroxy alkyl acrylates or methacrylates are for example ethyl acetate, toluene, dimethyl formamide or an isopropyl/water mixture.

The copolymer may be precipitated by pouring into a non-solvent such as petroleum ether.

Alternatively, the reaction may be taken almost to completion i.e. almost all of the monomer converted to polymer by refluxing, e.g. for 24 hours, to give a solution of the copolymer.

Films may be formed from the solution of the copolymer by casting a solution of the copolymer onto a smooth surface, for example release coated silicone paper or cast polypropylene, drying and stripping the film off the smooth surface.

To improve strength characteristics the copolymers may be self cross-linked by heating or may be cross-linked by the addition of a cross-linking agent or a catalyst. A copolymer of 80% by volume EEMA and 20% by volume HEMA may be self cross-linked by heating at 120°C for 1½ hours or longer in air atmosphere.

The films and coatings produced from the copolymers of the invention are transparent but if desired they may be pigmented.

The new copolymers may be used as films and coatings in adhesive, medical and surgical dressings and bandages, decorative nail coatings, surgical drapes, surface adhesive suture strips, nail varnishes, cosmetics such as eye liners and plastic dressings.

The present invention will now be further described with reference to the following examples:

EXAMPLE 1

80 mls. of EEMA, 20 mls. of HEMA, 0.3 grams of tertiary butyl peroctoate and 200 mls. of ethyl acetate were refluxed in a flask over a steam bath for 7 hours.

The reflux was carried out under an inert carbon dioxide atmosphere and the mixture was continuously stirred. The resulting copolymer was precipitated by pouring the mixture into petroleum ether, filtering, washing the residue and drying at 50°C. A yield 80 grams of copolymer was obtained.

The above procedure was repeated, but instead of precipitating the copolymer the polymerisation was completed by refluxing for 24 hours. A yield of 98.8 g (100% conversion) was obtained.

EXAMPLES 2–7

Using techniques as described in Example 1, copolymers were prepared using the percentages by volume of the monomers set out in Table I:

TABLE I

| EXAMPLE | % by volume EEMA | % by volume MEMA | % by volume HEMA | % by volume HPMA |
|---|---|---|---|---|
| 2 | 85 | | 15 | |
| 3 | 80 | | 20 | |
| 4 | 75 | | 25 | |
| 5 | 50 | | 50 | |
| 6 | 80 | | | 20 |
| 7 | | 90 | 10 | |

Using gel permeation chromatography techniques, molecular weight measurements of the polymer of Example 5 were obtained. These results were:

$M_{max}$ (i.e. modal value of molecular weight) = 150,000

$M_{mpv}$ (i.e. modal value of molecular weight) = 150,000

$\dfrac{M_w}{M_n}$ (i.e. weight average molecular weight / number average molecular weight) $\approx 3$ This ratio indicates the molecular weight dispersion.

The properties of 0.001 inch films of these polymers are set out in Table II:

TABLE II

| EXAMPLE | *WATER UPTAKE % | **MOISTURE VAPOUR PERMEABILITY (gm/sq metre/24 hours at 40°C and 100%/20% relative humidity.) | ***Tg °C |
|---|---|---|---|
| 2 | 2.25 | 4000 | |
| 3 | 3.8 | 4000 | 7 |
| 4 | 6.0 | 4100 | |
| 5 | 18.0 | 4200 | |
| 6 | 2.7 | 3500 | |
| 7 | 4.0 | 3900 | 19 |

The oxygen permeability transmission rate of the copolymer of Example 3, when measured according to B.S. 2782:1965 method 514A, was found to be 3000 mls/sq. metre/24 hrs/atms/thou thickness.

EXAMPLE 8

50 mls. of MEMA, 50 mls. of EEMA, 0.3 mls. of tertiary butyl peroctoate and 100 mls. of ethyl acetate were refluxed in an inert carbon dioxide atmosphere for 24 hours. The mixture was continuously stirred. Approximately 100% conversion was obtained.

The resulting syrup (solution) was cast onto a silicone coated release paper, dried in an oven and the film removed from the release paper. The properties of the film are set out in the Table below.

Using gel permeation chromatography techniques, molecular weight measurements of the polymer of this example were taken.

The results obtained were $M_{max} = 300,000$ $\dfrac{M_w}{M_n} \approx 3$

EXAMPLES 9 and 10

The method of Example 8 was repeated first using 60 mls. of MEMA and 40 mls. of EEMA (Example 9) and secondly using 70 mls. of MEMA and 30 mls. of EEMA (Example 10). The properties of 0.001 inch of these films are set out in Table III below.

TABLE III

| EXAMPLE | % by volume EEMA | % by volume MEMA | ** Moisture vapour permeability (gm/sq.metre/ 24 hrs. at 40°C and 100%/20% relative humidity). | ***Tg.(°C) |
| --- | --- | --- | --- | --- |
| 8 | 50 | 50 | 4600 | 5 |
| 9 | 40 | 60 | 4600 | 7 |
| 10 | 30 | 70 | 4600 | 9 |

\* Film squares (0.001 inch thick) were dried in a dessicator containing $CaCl_2$, weighed and then immersed in water for 24 hrs at 20°C. The samples were then removed, excess water removed with blotting paper and weighed.

\*\* Measured by the Payne cup method:

10 mls. of distilled water are added to the cup. A 2¼ inches diameter sample of the material to be tested (previously conditioned by storage at 20°C and 65% relative humidity for at least 8 hours) is clamped over the opening of the cup. The arrangement is then placed in an air circulating oven maintained at 40°C and a relative humidity of 20% for 24 hours. There is a difference in relative humidity between the two sides of the sample. Inside the cup the relative humidity is 100% and outside the cup the relative humidity is 20%. The loss of water from the cup is measured by weighing. The moisture vapour permeability of the sample is expressed as gms/sq.metre/24 hours at 40°C and 100%/20% relative humidity.

By multiplying the result obtained by the thickness of the sample (in thousandths of an inch) a rough approximation may be obtained for the moisture vapour permeability per thousandth of an inch thickness of the sample. This is only applicable to fairly thin samples however.

\*\*\*Glass transition temperatures. The glass transition temperature is the temperature below which the polymer is brittle. The higher the Tg therefore the more brittle the polymer.

| EXAMPLE 11 | Parts by volume (except where stated) |
| --- | --- |
| 2-HEMA | 48 |
| 2-EEMA | 48 |
| ethylene glycol dimethacrylate | 4 |
| Tetrahydrofuran | 65 |
| Di- isopropyl percarbonate | 0.5 g.m. |

The above ingredients were mixed at room temperature, heated to 60°C to initiate polymerisation and allowed to cool. A transparent cross-linked gel was obtained.

EXAMPLE 12

A number of 0.001 inch thick films were made by casting from solutions of various copolymers of the invention. The films were dried and during drying were subjected to a temperature of 120°C for at least 5 minutes to remove excess monomer. The tensile properties of 1 inch wide strips of the films were measured on an "Instron" machine over a gauge length of 2 inches and a jaw separation rate of 1 inch per minute and at a temperature of 20°C. The results of these tests are shown in Table IV.

TABLE IV

| COPOLYMER FILM | Yield point (g/0.001") | % Elongation at break |
| --- | --- | --- |
| 90 : 10 MEMA – HEMA | 1020 | > 100 |
| 80 : 20 EEMA – HEMA | 440 | > 150 |
| 50 : 50 MEMA – EEMA | 180 | > 200 |
| 70 : 30 MEMA – EEMA | 290 | > 200 |

The EEMA used in the examples contained 2-ethoxy ethyl methacrylate for the most part together with a very small proportion of methyl methacrylate as an impurity.

The HEMA used in the examples contained 2-hydroxy ethyl methacrylate for the most part, together with a small amount of di-ethylene glycol monomethacrylate, ethylene glycol dimethacrylate and methacrylic acid as impurities.

The MEMA used in the examples contained 2-methoxy ethyl methacrylate for the most part, together with a very small proportion of methyl methacrylate as an impurity.

The HPMA used in the examples contained for the most part 2-hydroxypropyl methacrylate.

We claim:

1. A copolymer prepared by copolymerizing in the presence of a free-radical initiator (a) 90 to 50 parts by volume of an alkoxy alkyl methacrylate selected from the group consisting of ethoxy ethyl methacrylate and methoxy ethyl methacrylate with (b) from 10 to 50 parts by volume of a hydroxy alkyl methacrylate selected from the group consisting of hydroxy ethyl methacrylate and hydroxy propyl methacrylate and optionally with a minor amount of a further monomer.

2. A film or coating made from a copolymer as claimed in claim 1.

\* \* \* \* \*

UNITED STATES PATENT OFFICE
CERTIFICATE OF CORRECTION

Patent No. 3,893,988          Dated July 8, 1975

Inventor(s) Donald Edwin Seymour et al

It is certified that error appears in the above-identified patent and that said Letters Patent are hereby corrected as shown below:

Claims priority of British Provisional Applications No. 50044/68, filed October 22, 1968 and No. 60754/68, filed December 20, 1968.

Signed and Sealed this twenty-third Day of December 1975

[SEAL]

Attest:

RUTH C. MASON
*Attesting Officer*

C. MARSHALL DANN
*Commissioner of Patents and Trademarks*